United States Patent
Wu

(10) Patent No.: US 9,992,839 B2
(45) Date of Patent: Jun. 5, 2018

(54) CONTROL SYSTEM FOR COLOR TEMPERATURE REGULATION OF LED LIGHTS

(71) Applicant: Guangyi Wu, Shengzhou (CN)

(72) Inventor: Guangyi Wu, Shengzhou (CN)

( * ) Notice: Subject to any disclaimer, the term of this patent is extended or adjusted under 35 U.S.C. 154(b) by 0 days. days.

(21) Appl. No.: 15/469,042

(22) Filed: Mar. 24, 2017

(65) Prior Publication Data

US 2017/0290123 A1    Oct. 5, 2017

(30) Foreign Application Priority Data

Mar. 29, 2016 (CN) ...................... 2016 2 0252553 U

(51) Int. Cl.
*H05B 37/00* (2006.01)
*H05B 33/08* (2006.01)

(52) U.S. Cl.
CPC ..... *H05B 33/0857* (2013.01); *H05B 33/0809* (2013.01); *H05B 33/0815* (2013.01); *H05B 33/0845* (2013.01); *H05B 33/0887* (2013.01)

(58) Field of Classification Search
CPC ............ H05B 33/0809; H05B 33/0815; H05B 33/0827; H05B 33/0845; H05B 33/0857
USPC .............................................. 315/185 R, 192
See application file for complete search history.

(56) References Cited

U.S. PATENT DOCUMENTS

| | | | | |
|---|---|---|---|---|
| 2010/0072919 A1* | 3/2010 | Wei | ........................... | F21K 9/00 315/294 |
| 2010/0328946 A1* | 12/2010 | Borkar | ............... | H05B 33/0845 362/249.02 |
| 2012/0032597 A1* | 2/2012 | Lai | ..................... | H05B 33/0809 315/113 |
| 2012/0119662 A1* | 5/2012 | Radermacher | ..... | H05B 33/0851 315/158 |
| 2013/0015774 A1* | 1/2013 | Briggs | ............... | H05B 33/0815 315/186 |
| 2015/0137704 A1* | 5/2015 | Angeles | ............. | H05B 33/0815 315/297 |

(Continued)

*Primary Examiner* — Tung X Le
(74) *Attorney, Agent, or Firm* — Jiwen Chen

(57) ABSTRACT

The present invention discloses a control system for color temperature regulation of LED lights, comprising an AC input and a rectifying circuit. The rectifying circuit is connected with an absorption circuit; the absorption circuit is connected with a current regulation control module; a detection circuit is disposed between the current regulation control module and the absorption circuit; the current regulation control module is connected with a cold color series LED light module and a warm color series LED light module in parallel; and the cold color series LED light module and the warm color series LED light module generate a voltage difference. According to the present invention, through the configuration where the cold color series LEDs and the warm color series LEDs generate different voltages at different currents, the cold color series LED light module and the warm color series LED light module generate different voltage drops at different currents by means of the arrangement of resistors, achieving the effects of changing color temperature and regulating light. The process of the color temperature change is natural and smooth, enhancing visual comfortableness for users. Meanwhile, the control system for color temperature regulation of LED lights has a simple structure and is low in cost.

2 Claims, 1 Drawing Sheet

(56) References Cited

U.S. PATENT DOCUMENTS

2015/0271891 A1* 9/2015 Wu .................... H05B 33/0866
315/201

* cited by examiner

US 9,992,839 B2

CONTROL SYSTEM FOR COLOR TEMPERATURE REGULATION OF LED LIGHTS

This application claims the priority benefit of Chinese Application No. 201620252553.0 filed Mar. 29, 2016, which is hereby incorporated by reference.

TECHNICAL FIELD

The present invention belongs to the technical field of LED lights, in particular to a control system for color temperature regulation of LED lights.

BACKGROUND TECHNOLOGY

As a light-emitting source, LED lights have advantages in low energy consumption, short response time, long service life, etc., which made LED lights increasingly broadly used in the illumination and decorative lightening. At present, reliability of the LED lights is a factor that is usually taken into the first consideration during actual use, and is one of important performance indexes of the LED lights. Large-power LED lights are required to successfully perform product functions, and the stability, service life and environmental adaptability of the products are also required to be taken into full consideration. LED lights with changes in color temperature are the mainstream of the current market. Color temperature of the LED lights refers to the color variation, from dark red to light red, orange yellow, white, blue white and blue, of a standard black object along with the temperature rise when the black object is being heated. By using such characteristic of the black object, it is determined that the temperature of the black object is the color temperature of a light source to be detected when the light color of the light source to be detected is identical with the light color of the black object at a certain temperature. When the color temperature is higher, the light color is colder, and when the color temperature is lower, the light color is warmer. When the existing LED lights are on, the voltage difference of the LED chips results in non-uniform current, unbalanced light emission, and large color variation to the illuminating LED light array disposed on the LED light panel, so people feel visually uncomfortable.

Contents of the Invention

The object of the present invention is to solve the technical problem in the prior art. The present invention provides a control system for color temperature regulation of LED lights, which can naturally change the color temperature and regulate the light, enhance the visual comfort, reduce the cost and have remarkable economical benefits.

In order to solve the above technical problems, the present invention employs the following technical solution:

A control system for color temperature regulation of LED lights comprises an AC (alternating current) input and a rectifying circuit, characterized in that the rectifying circuit is connected with an absorption circuit; the absorption circuit is connected with a current regulation control module; a detection circuit is disposed between the current regulation control module and the absorption circuit; the current regulation control module is connected with a cold color series LED light module and a warm color series LED light module in parallel; and the cold color series LED light module and the warm color series LED light module generate a voltage difference. The control system for color temperature regulation of LED lights can naturally change the color temperature and regulate the light, enhance the visual comfort, reduce the cost and have remarkable economical benefits.

Further, the cold color series LED light module and the warm color series LED light module are both connected with resistors in series.

Further, the warm color series LED light module is connected with resistors in series.

Further, the standard voltage difference between the cold color series LED light module and the warm color series LED light module is 5%-30%.

Further, the warm color series LED light module comprises at least two warm color series LEDs, and the warm color series LEDs are connected in series.

Further, the color temperature of the warm color series LEDs is 2,500-3,000K.

Further, the cold color series LED light module comprises at least two cold color series LEDs, and the cold color series LEDs are connected in series.

Further, the color temperature of the cold color series LEDs is 5,000K.

By employing the above technical solution, the present invention has the following effects:

1. The cold color series LED light module and the warm color series LED light module in the present invention generate a voltage difference. The standard voltage difference between the cold color series LED light module and the warm color series LED light module is 5%-30%. The cold color series LEDs and the warm color series LEDs generate different voltages at different currents. Due to the configuration of the resistors, the cold color series LED light module and the warm color series LED light module generate different voltage drops at different currents, achieving the effect of changing the color temperature and regulating light. The process of color temperature change is natural and smooth, improving visual comfort for users.

2. Compared with the mode where the current regulation control module is respectively connected in series with and controls the cold color series LED light module and the warm color series LED light module, the present invention saves cost by at least 50% and has a low cost.

3. According to the present invention, the detection circuit is disposed between the current regulation control module and the absorption circuit, enhancing the safety of the whole current regulation process. Meanwhile, the control system for color temperature regulation of LED lights is simply structured and has remarkable economical benefits.

BRIEF DESCRIPTION OF THE DRAWINGS

The present invention is further described in conjunction with the attached drawings.

DETAILED DESCRIPTION OF THE INVENTION

Figure 1:
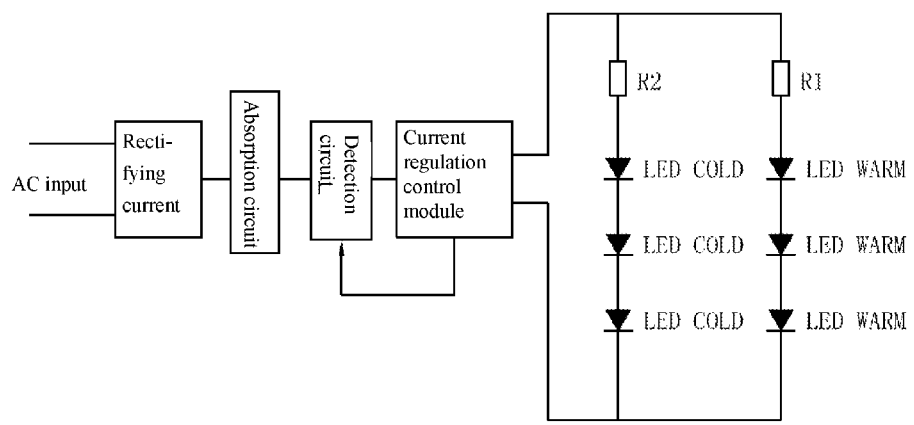
FIG. 1 is a schematic block diagram of embodiment 1 of a control system for color temperature regulation of LED lights of the present invention.
Figure 2:
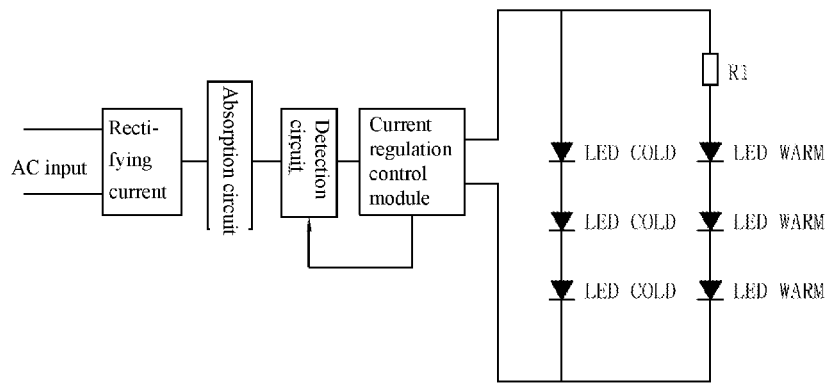
FIG. 2 is a schematic block diagram of embodiment 2 of a control system for color temperature regulation of LED lights of the present invention.

As shown in FIG. 1 and FIG. 2, a control system for color temperature regulation of LED lights of the present invention comprise an AC input and a rectifying circuit. The AC input is one of the switching power supplies, which converts an alternating current into a direct current, and of which the power flow direction is two-way. The rectifying circuit is a circuit which converts the electric energy of the alternating current into the electric energy of the direct current. The rectifying circuit converts a relatively low voltage alternating current output by an AC voltage reduction circuit into a one-way pulsating direct current. The rectifying circuit is connected with the absorption circuit. The absorption circuit is an important protective circuit of a power electric device, which restrains the current rise rate of the device by using the feature that the inductive current cannot break and restrains the voltage rise rate of the device by using the feature that the capacitance voltage cannot break. The absorption circuit is connected with a current regulation control module, and a detection circuit is disposed between the current regulation control module and the absorption circuit. The detection circuit enhances the safety of the current regulation process.

The current regulation control module is connected with a cold color series LED light module and a warm color series LED light module in parallel. The warm color series LED light module comprises at least two warm color series LEDs; the warm color series LEDs are connected in series; and the color temperature of the warm color series LEDs is 2,500-3,000K. The cold color series LED light module includes at least two cold color series LEDs; the cold color series LEDs are connected in series; and the color temperature of the cold color series LEDs is greater than 5,000K.

The cold color series LED light module and the warm color series LED light module generate a voltage difference. The standard voltage difference between the cold color series LED light module and the warm color series LED light module is 5%-30%. The difference voltage drop is mainly reflected in the following way: the cold color series LED light module and the warm color series LED light module are both connected with resistors in series or the warm color series LED light module is connected with resistors in series.

Embodiment 1

As shown in FIG. 1, an AC input is connected with a rectifying circuit; the rectifying circuit is connected with an absorption circuit; the absorption circuit is connected with a current regulation control module; a detection circuit is disposed between the current regulation control module and the absorption circuit; and the current regulation control module is connected with a cold color series LED light module and a warm color series LED light module in parallel. The circuit of the warm color series LED light module is connected with a resistor R1 in series, and the circuit of the cold color series LED light module is connected with a resistor R2 in series. The cold color series LED light module and the warm color series LED light module generate a voltage difference. The cold color series LED light module and the warm color series LED light module generate different voltages at different currents. By the configured resistor R1 and resistor R2, different voltage drops are generated at different currents. The warm color light corresponds to a low color temperature, and at a low color temperature, the voltage is low, so the effect of variable color temperature is achieved.

Embodiment 2

As shown in FIG. 2, an AC input is connected with a rectifying circuit; the rectifying circuit is connected with an absorption circuit; the absorption circuit is connected with a current regulation control module; a detection circuit is connected between the current regulation control module and the absorption circuit; and the current regulation control module is connected with a cold color series LED light module and the warm color series LED light module in parallel. The circuit of the warm color series LED light module is connected with a resistor R1 in series, and the circuit of the cold color series LED light module does not include a resistor R2. The cold color series LED light module and the warm color series LED light module generate a voltage difference. The cold color series LED light module and the warm color series LED light module different voltages at different currents. By the configured resistor R1, different voltage drops are generated at different currents. The warm color light corresponds to a low color temperature, and at a low color temperature, the voltage is low, so the effect of variable color temperature is achieved.

The cold color series LED light module and the warm color series LED light module the present invention generate a voltage difference. The standard voltage difference between the cold color series LED light module and the warm color series LED light module is 5%-30%. The cold color series LEDs and the warm color series LEDs generate different voltages at different currents. Due to the configuration of the resistors, the cold color series LED light module and the warm color series LED light module generate different voltage drops at different currents, achieving the effect of changing the color temperature and regulating light. The process of color temperature change is natural and smooth, improving visual comfort degree for users. Compared with the mode where the current regulation control module is respectively connected in series with and controls the cold color series LED light module and the warm color series LED light module, the present invention saves cost by at least 50% and has low cost. According to the present invention, the detection circuit is disposed between the current regulation control module and the absorption circuit, enhancing the safety of the whole current regulation process. Meanwhile, the control system is simply structured and has remarkable economical benefits.

The above are specific embodiment of the present invention only, but the technical characteristics of the present invention are not limited to the above embodiment. Any simple changes, equivalent substitution or modifications on the basis of the present invention to solve the basically the same technical problems and realize the basically the same technical effects shall be incorporated into the protective scope of the present invention.

What is claimed is:
1. A control system for color temperature regulation of LED lights, comprising an AC input and a rectifying circuit, characterized in that the rectifying circuit is connected with an absorption circuit; the absorption circuit is connected with a current regulation control module; a detection circuit is disposed between the current regulation control module and the absorption circuit; the current regulation control module is connected with a cold color series LED light module and a warm color series LED light module in parallel; and the cold color series LED light module and the warm color series LED light module generate a voltage difference;
   wherein the cold color series LED light module and the warm color series LED light module are both connected with resistors in series;

wherein the standard voltage difference between the cold color series LED light module and the warm color series LED light module is 5%-30%;

wherein the warm color series LED light module comprises at least two warm color series LEDs, and the warm color series LEDs are connected in series;

wherein the color temperature of the warm color series LEDs is 2,500-3,000K;

wherein the cold color series LED light module comprises at least two cold color series LEDs, and the cold color series LEDs are connected in series; and wherein the color temperature of the cold color series LEDs is 5,000K.

2. A control system for color temperature regulation of LED lights, consisting of an AC input, a rectifying circuit, an absorption circuit, a detection circuit, a current regulation control module, a cold color series LED light module and a warm color series LED light module, characterized in that the rectifying circuit is connected with the absorption circuit; the absorption circuit is connected with the current regulation control module; the detection circuit is disposed between the current regulation control module and the absorption circuit; the current regulation control module is connected with the cold color series LED light module and the warm color series LED light module in parallel; and the cold color series LED light module and the warm color series LED light module generate a voltage difference;

wherein the cold color series LED light module and the warm color series LED light module are both connected with resistors in series or only the warm color series LED light module are connected with a resistor in series;

wherein the standard voltage difference between the cold color series LED light module and the warm color series LED light module is 5%-30%;

wherein the warm color series LED light module comprises at least two warm color series LEDs, and the warm color series LEDs are connected in series;

wherein the color temperature of the warm color series LEDs is 2,500-3,000K;

wherein the cold color series LED light module comprises at least two cold color series LEDs, and the cold color series LEDs are connected in series; and wherein the color temperature of the cold color series LEDs is 5,000K.

* * * * *